United States Patent [19]

Ishiguro et al.

[11] Patent Number: 4,836,991

[45] Date of Patent: Jun. 6, 1989

[54] METHOD FOR CONTROLLING WET-PROCESS FLUE GAS DESULFURIZATION

[75] Inventors: Okikazu Ishiguro, Kure; Masakatsu Nishimura, Shimizu; Shigeru Nozawa, Kure; Hiromi Kamogawa, Kure; Shigeyoshi Kawano, Kure, all of Japan

[73] Assignee: Babcock-Hitachi Kabushiki Kaisha, Tokyo, Japan

[21] Appl. No.: 41,224

[22] Filed: Apr. 22, 1987

[30] Foreign Application Priority Data

Apr. 23, 1986 [JP] Japan .................... 61-93592

[51] Int. Cl.$^4$ .................... C01B 17/00; C01F 1/00; C01F 11/46
[52] U.S. Cl. .................... 423/242; 423/166; 423/555
[58] Field of Search ............... 423/242 A, 242 R, 555, 423/166

[56] References Cited

U.S. PATENT DOCUMENTS

| | | | |
|---|---|---|---|
| 3,767,765 | 10/1973 | Gustavsson et al. | 423/220 |
| 4,539,190 | 9/1985 | Shinoda et al. | 423/242 |
| 4,582,692 | 4/1986 | Hamanaka et al. | 423/242 |

FOREIGN PATENT DOCUMENTS

| | | | |
|---|---|---|---|
| 3523820 | 1/1986 | Fed. Rep. of Germany . | |
| 54-24277 | 2/1977 | Japan | 423/242 |
| 55-20633 | 2/1980 | Japan | 423/242 |
| 59-225724 | 12/1984 | Japan | 423/242 |

OTHER PUBLICATIONS

European Search Report EP 87 30 3530.
Patent Abstracts of Japan, vol. 9, No. 66 (C-271) (1789), Mar. 26, 1985 and JP A 59 199 021 Mitsubishi Jukogyo 11-12-84.
Patent Abstracts of Japan, vol. 9, No. 96 (C278) (1819) Apr. 25, 1985; and JP-A-59 225 723 (Mitsubishi Jukogyo) 12-18-84.

*Primary Examiner*—Gregory A. Heller
*Attorney, Agent, or Firm*—Antonelli, Terry & Wands

[57] ABSTRACT

Optimum overall operation of a whole plant including a combustion unit such as a boiler and a wet-process flue gas desulfurization unit comprising an absorption column for removing sulfur dioxide from a flue gas from the combustion unit by absorption using a slurry of an absorbing agent such as limestone powder circulated through absorption column, recycle pumps for circulating the slurry through the absorption column and oxidation air blowers for supplying an oxidation air to the absorption column and a recycle tank is controlled by anticipating a future pH value of the circulating slurry and a future inlet sulfur dioxide content of the flue gas from a present pH value of the circulating slurry and a present inlet sulfur dioxide content of the flue gas and their change rates by computing, anticipating a future desulfurization ratio from both the anticipated pH value and inlet $SO_2$ content and a recycle rate of the slurry, and controlling the recycle rate of the circulating slurry on the basis of the anticipated desulfurization ratio, where a desired desulfurization ratio can be readily and continuously maintained against any change in fuel species and load of a boiler with reduced utility consumption.

13 Claims, 3 Drawing Sheets

METHOD FOR CONTROLLING WET-PROCESS FLUE GAS DESULFURIZATION

BACKGROUND OF THE INVENTION

This invention relates to a method for controlling wet-process flue gas desulfurization, and more particularly to a method for controlling wet-process flue gas desulfurization suitable for optimum operating control of a whole plant including a combustion unit such as a boiler, etc. and a desulfurization unit.

PRIOR ART

According to a conventional method for controlling wet-process flue gas desulfurization, as shown in FIG. 3, an $SO_2$-containing flue gas 301 is introduced into a desulfurization unit 5, brought into contact through a contactor 302 with a slurry of an absorbing agent circulated by recycle pumps 8 through the desulfurization unit 5, as sprayed against the flue gas, to absorb $SO_2$ from the flue gas 301, and discharged from the desulfurization unit 5 as a desulfurization flue gas 6. During the absorbing operation, an optimum pH signal 51 for the operating condition and a signal 50 for driving an optimum number of recycle pumps 8 are computed by a control computer 49 according to a given simulation model, and a flow rate control valve 7 is controlled to adjust the degree of opening by a feedback signal based on the pH signal 51 through a controller 43d interlocked with a flow rate meter 29 for a fresh slurry of the absorbing agent to adjust the flow rate of the fresh slurry of the absorbing agent and also the flow rate of the circulation slurry of the absorbing agent is adjusted by controlling the number of recycle pumps 8 on the basis of the signal 50.

Requirements for the control of a desulfurization unit are to maintain the necessary desulfurization ratio in every operating state and minimize the total utility, that is, the consumption of the absorbing agent, the power cost of recycle pumps, etc. However, in the conventional methods for controlling the wet-process flue gas desulfurization, no consideration has been paid to the conditions on the flue gas inlet side, that is, boiler fuel properties. For example, in case of coal firing, differences in the contents of F, Cl, etc. have a large influence upon the desulfurization performance, depending upon the coal species and serve as a controlling factor.

In case of coal firing, F, Cl, etc. contained in a flue gas has an adverse effect upon the desulfurization performance, and in order to prevent the adverse effect, an alkali agent is supplied to the circulating slurry of the absorbing agent at a rate obtained merely by multiplying the flow rate of F, Cl, etc. by a constant coefficient in the conventional method. In case of forced oxidation of sulfites formed by absorption of $SO_2$ in a recycle tank, the rate of autogenous oxidation in the absorption column and the rate of oxidation with air in the recycle tank cannot be measured according to an online method, and thus a constant number of oxidation air blowers are used for supplying the air for the forced oxidation, and thus more than the necessary power is consumed by driving the air blowers according to the conventional method.

The factors having a control over the desulfurization performance are the inlet $SO_2$ content of the flue gas, the pH of the circulating slurry of the absorbing agent, and the flow rate of circulating slurry of the absorbing agent, but the controllable factors are the supply rate of the fresh slurry of the absorbing agent which has an effect on the pH of the circulating slurry of the absorbing agent and the driving number of the recycle pumps which determines the flow of the circulating slurry of the absorbing agent.

In order to maintain the desulfurization ratio continuously required for load fluctuation conditions on the inlet side of the desulfurization unit, it is necessary to appropriately control the supply rate of a fresh slurry of the absorbing agent to the circulating slurry and the driving number of the recycle pumps for the absorption column. To this end, future desulfurization performance values, such as operating conditions and various operating factors such as the driving number of recycle pumps for the absorption column, the supply rate of the fresh slurry of the absorbing agent to the circulating slurry, the supply rate of an alkali agent to the circulating slurry and the driving number of oxidation air blowers, must be anticipated. In the conventional method, no consideration has been paid to specific control means for this purpose. That is, no consideration has been paid to optimum overall control on the operation of a whole plant including a combustion unit and a desulfurization unit.

In the conventional method for controlling the wet-process flue gas desulfurization, consideration has been paid only to the desulfurization unit and the effect by fuel species in a combustion unit such as a boiler has not been taken in account. That is, it can be said that no optimum control has been established in a case of a whole plant including a combustion unit and a desulfurization unit.

SUMMARY OF THE INVENTION

As object of the present invention is to provide a method for controlling wet-process flue gas desulfurization by anticipating future operating factors in a desulfurization unit in accordance with changes in the operating conditions on a combustion unit side (for example, changes in fuel species, load, etc.) by a computing means, maintaining functions required for the desulfurization unit based on the anticipated operating factors, and reducing the utility consumption.

This object of the present invention can be attained by anticipating desulfurization performance values, oxidation performance values, etc. in accordance with changes in operating conditions on the combustion unit side such as changes in the load pattern and fuel species by a computing means, and controlling operation of a desulfurization unit on the basis of the anticipated desulfurization performance values, oxidation performance values, etc. and output from the computing means.

That is, the present invention provides a method for controlling wet-process flue gas desulfurization in a whole plant including a combustion unit and a wet-process flue gas desulfurization unit comprising an absorption column for removing sulfur dioxide from a flue gas from the combustion unit by absorption using a slurry of an absorbing agent such as limestone powders circulated through the absorption column, recycle pumps for circulating the slurry of the absorbing agent through the absorption column, and oxidation air blowers for supplying an oxidation air to the absorption column and a recycle tank, which comprises anticipating a future pH value of the circulating slurry and a future inlet sulfur dioxide content of the flue gas from a present pH value of the circulating slurry of the absorbing agent and a present inlet sulfur dioxide content of the flue gas and their change rates by computing, anticipating a future desulfurization ratio from both the anticipated pH value and inlet $SO_2$ content and a recycle rate of the circulating slurry, and controlling the recycle rate of the circulating slurry of the absorbing agent on the basis of the anticipated desulfurization ratio.

In the present invention, a necessary amount of sulfite to be oxidized is computed from amounts of sulfate and sulfite in the circulating slurry, obtained from the present pH value, a necessary amount of oxidation air is determined from the amount of sulfite to be oxidized, and a rate of the oxidation air to be introduced is controlled on the basis of the necessary amount of oxidation air. The recycle rate of the circulating slurry by the recycle pumps is controlled by controlling a driving number of the recycle pumps, and the rate of oxidation air to be introduced is controlled by controlling a driving number of the oxidation air blowers.

In the present invention, a rate of a fresh absorbing agent to be supplied to the circulating slurry is controlled by adjusting a pH set value in accordance with fuel properties, and an alkali agent is supplied to the circulating slurry in accordance with absolute contents of F and Cl in the flue gas.

Among the operating factors such as the driving number of recycle pumps for the absorption column, the rate of an absorbing agent to be supplied, the rate of alkali agent to be supplied, and the driving number of oxidation air blowers, the driving number of recycle pumps for the absorption column and the driving number of oxidation air blowers are the operating factors having a large effect upon the desulfurization performance and energy saving.

The driving number of recycle pumps for the absorption column is controlled so that the necessary desulfurization ratio can be maintained to meet changes in operating states because the future desulfurization ratio can be anticipated by a desulfurization ratio-anticipating computer means. The driving number of oxidation air blowers is controlled so that the necessary amount of oxidation air can be continuously supplied by a control circuit means that can compute the present necessary amount of sulfite to be oxidized. That is, the present necessary amount of sulfite to be oxidized is to be computed, whereas a future desulfurization ratio is anticipated in the present invention for the following reasons.

A necessary amount of oxidation air is immediately supplied to the $SO_2$-absorbed slurry in the recycle tank by controlling the driving number of oxidation air blowers on the basis of the computed present amount of sulfite to be oxidized, and the oxidation reaction of sulfite by air proceeds in the same order as that of the absorption rate of sulfur dioxide into the slurry of the absorbing agent, that is, the oxidation reaction proceeds very rapidly. Thus, as was experimentally confirmed, controlling of the amount of oxidation air on the basis of the computed present amount of sulfite to be oxidized has no problem at all.

On the other hand, among the on-line measurement factors which control the desulfurization ratio, that is, the inlet $SO_2$ rate, the pH of the circulating slurry, and the recycle rate of the circulating slurry, the responce of pH is very slow. The pH of the circulating slurry depends on the amount of $SO_2$ absorbed and the concentration of the absorbing agent in the circulating slurry as shown in FIG. 4.

Changes in the amount of $SO_2$ to be absorbed have a quick response, whereas changes in the concentration of the absorbing agent in the slurry have a slow response, because the volume of the circulating slurry in the recycle tank is usually very large and the residence time of the absorbing agent in the slurry in the recycle tank is a few 10 hours. That is, time constant for the changes in the concentration of the absorbing agent in the circulating slurry by $SO_2$ absorption is a few 10 hours when the amount of $SO_2$ to be absorbed is presumed to be constant. For example, when the present concentration of the absorbing agent in the slurry is 0.1% by weight, it will take a few 10 hours to increase the concentration to 0.2% by weight by supplying a double amount of the absorbing agent to the circulating slurry. That is, changes in the concentration of the absorbing agent in the slurry take place slowly, so that the pH responce* is greatly delayed. In other words, in case of an increase in the load, the concentration of the absorbing agent in the slurry cannot reach the necessary concentration for maintaining the constant pH as quickly as desired, and the pH of the slurry is lowered with increasing amount of the absorbed $SO_2$. That is, unless a future pH value is anticipated, thereby anticipating the desulfurization ratio, the necessary driving number of recycle pumps for maintaining the necessary desulfurization ratio cannot be determined.

According to the present method for controlling the wet-process flue gas desulfurization, desulfurization performance can be continuously maintained as desired, even if the fuel species or the load is changed, and the utility is not consumed wastefully.

PREFERRED EMBODIMENTS OF THE INVENTION

The present invention will be described in detail below, referring to the accompanying drawings.

Figure 1:
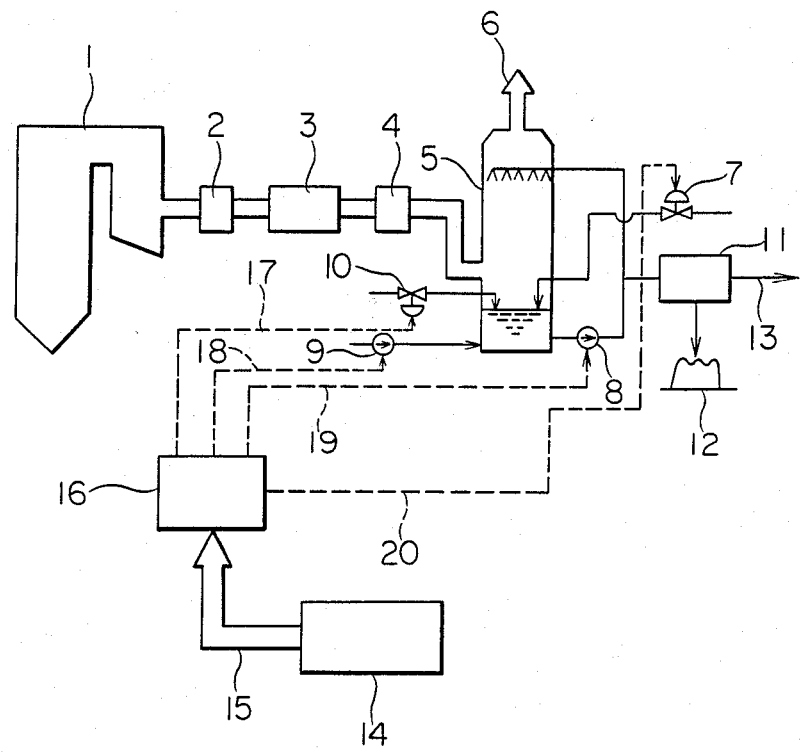
FIG. 1 is a schematic control diagram showing one embodiment of the present method for controlling the wet-process flue gas desulfurization.

FIG. 1 is a schematic control diagram showing one embodiment of the present method for controlling the wet-process flue gas desulfurization, where numeral 1 is a boiler, 2 an electrostatic precipitator, 3 an $NO_x$ removal unit, 4 an air preheater, 5 a desulfurization unit, 6 a desulfurized flue gas, 7 a flow rate control valve for a fresh slurry of an absorbing agent such as limestone powders, 8 recycle pumps for an absorption column, 9 oxidation air blowers, 10 a flow rate control valve for an alkali agent, 11 a gypsum recovery unit, 12 gypsum, 13 waste water, 14 an on-line data pool, 15 an on-line data signal, 16 a desulfurization controller, 17 a control signal to the flow rate control valve for an alkali agent, 18 a signal for controlling the driving number of the oxidation air blowers, 19 a signal for controlling the driving number of the recycle pumps for the absorption column, and 20 a signal for controlling the flow rate control valve for the fresh slurry of the absorbing agent.

A flue gas from the boiler 1 is passed through the electrostatic precipitator 2 to remove a portion of dusts from the flue gas, then through the $NO_x$ removal unit 3 to remove $NO_x$ from the flue gas, cooled in the air preheater 4 and led to the desulfurization unit 5, where $SO_4$ in the flue gas is brought in gas-liquid control with the circulating slurry of the absorbing agent, that is, the slurry that has already partially absorbed $SO_2$ and contains $CaSO_3$, $CaSO_4$, $CaCo_3$, etc. recycled by the recycle pumps 8 provided at the absorption column. The desulfurized gas 6 is discharged from the desulfurization unit 5.

Fresh absorbing agent is supplied to the desulfurization unit 5 after the flow rate of the absorbing agent is adjusted by the flow rate control valve 7 for the fresh slurry of the absorbing agent, whose the degree of opening is controlled by a control signal 20 as an output signal from the desulfurization control unit 16. F, Cl, Al, etc. in the flue gas enter into the circulating slurry to deteriorate the desulfurization performance, and thus an alkali agent such as NaOH, etc. is supplied to the circulating slurry by adjusting the degree of opening of the flow rate control valve 10 on the basis of a control signal 17 as an output signal from the desulfurization control unit 16 to remove the said F, Cl, Al and other adverse components as solids from the circulating slurry. The flow rate of the circulating slurry to be brought into gas-liquid contact with $SO_2$ is adjusted by controlling the driving number of recycle pumps 8 provided at the absorption column on the basis of a control signal 19 as an output signal from the desulfurization control unit 16. The driving number of oxidation air blowers 9 is determined by a control signal 18 as an output signal from the desulfurization control unit 16. A portion of the circulating slurry is introduced into the gypsum recovery unit 11 to recover $CaSO_4$ from it as gypsum 12, while the supernatant or filtrate water is discharged as waste water. The on-line data pool 14 emits on-line data signals 15 of boiler 1 and desulfurization unit 5 to the desulfurization control unit 16.

Figure 2:
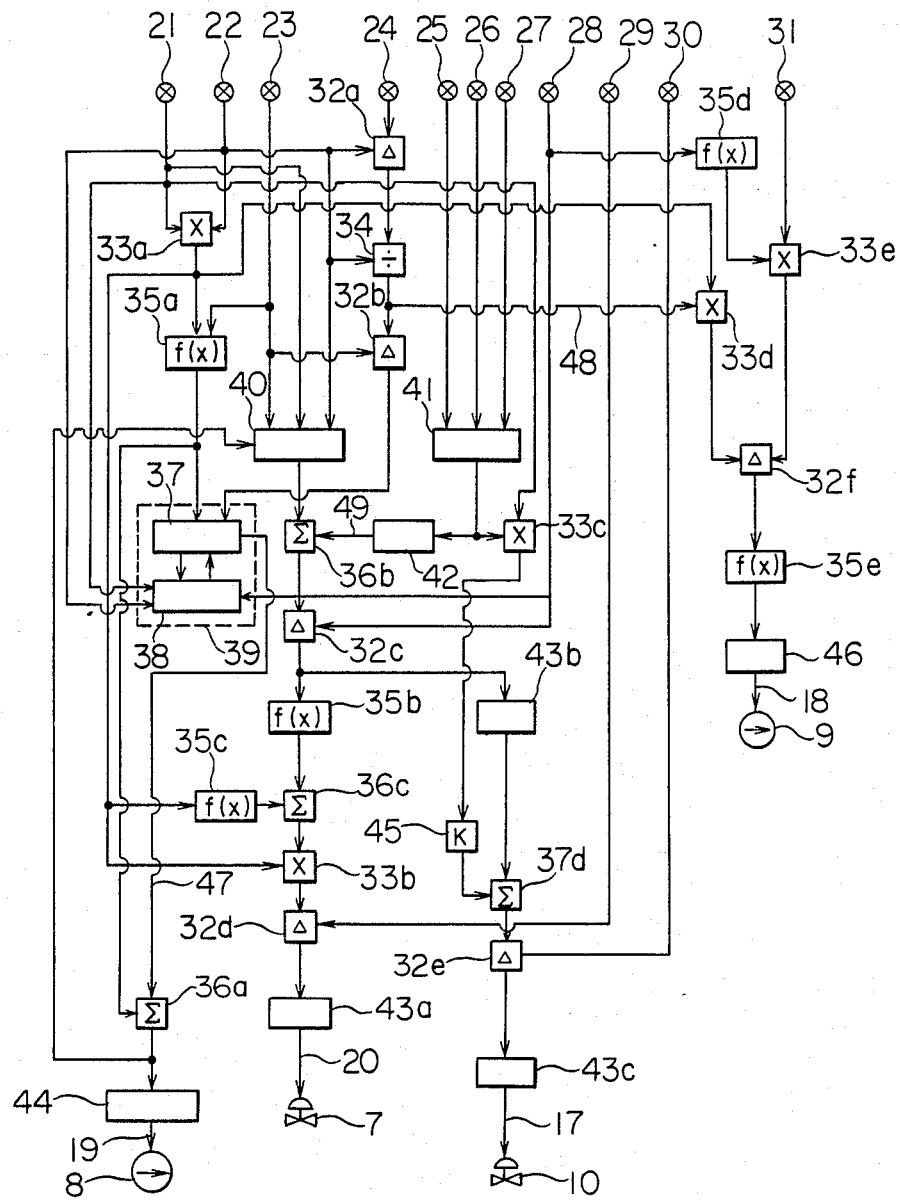
FIG. 2 is a control system diagram according to the embodiment of FIG. 1.
Figure 3:
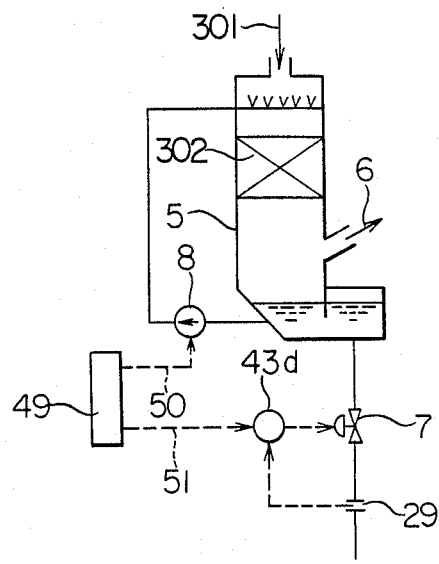
FIG. 3 is a schematic control diagram of a conventional method for controlling the wet-process flue gas desulfurization.
Figure 4:
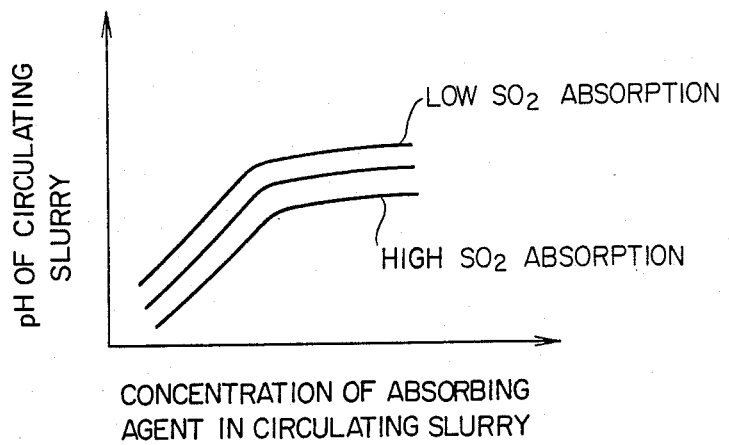
FIG. 4 is a diagram showing a correlation between the concentration of an absorbing agent in the circulating slurry and the pH of the circulating slurry.

FIG. 2 shows the structure of the desulfurization control unit 16, where numeral 21 is a flue gas flow rate meter, 22 an inlet $SO_2$ concentration meter, 23 a desulfurization ratio setting element, 24 an outlet $SO_2$ concentration meter, 25 a fuel flow rate meter, 26 an air flow rate meter, 27 fuel property data pool, 28 a pH meter, 29 a flow rate meter for a fresh slurry of an absorbing agent, 30 a flow rate meter for an alkali agent, 31 a recycle slurry flow rate meter to the absorption column, 32 a subtractor, 33 a multiplier, 31 a divider, 35 a function generator, 36 an adder, 37 an adjustor for the driving number of pumps, 38 a computer for anticipating the desulfurization ratio, 39 a controller for the driving number of pumps, 40 a computer for pH set value, 41 a computer for anticipating F and Cl concentrations in flue gas, 42 a computer for correcting pH set value, 43 a controller, 44 a unit for controlling the driving number of pumps, 45 a scale-factor element, and 46 a unit for controlling the driving number of oxidation air blowers.

An output signal from the flue gas flow rate meter 21 is multiplied with an output signal from the inlet $SO_2$ concentration meter 22 in the multiplier 33a to obtain an absolute $SO_2$ amount as an output signal from the multiplier 33a. From this output signal and an output signal from the desulfurization ratio setting element 23 is obtained a set value for the driving number of recycle pumps 8 provided at the absorption column in the function generator 35a. In the controller 39 for the driving number of pumps, a signal 47 for adjusting the driving number of pumps is computed from an output signal from the inlet $SO_2$ concentration meter 22, an output signal from the flue gas flow rate meter 21, an output signal from the pH meter 28, an output signal from the subtractor 32b and an output signal from the function generator 35a by means of the adjustor 37 for the driving number of pumps and the computer 38 for anticipating the desulfurization ratio. In the adder 36a, the output signal from the function generator 35a is added to the signal from the controller 39 for the driving number of pumps as the signal 47 for adjusting the driving number of pumps, and the output signal therefrom is input to the unit 44 for controlling the driving number of oxidation air blowers. An output signal 19 therefrom for controlling the driving number of recycle pumps for the absorption column determines the driving number of recycle pumps 8 for the absorption column.

A deviation of an output signal from the inlet $SO_2$ concentration meter 22 from an output signal from the outlet $SO_2$ concentration meter 24 is obtained in the subtractor 32a and an output signal therefrom is divided by the output signal from the inlet $SO_2$ concentration meter 22 in the divider 34, whereby an output signal from the divider 34 as a desulfurization ratio signal 48 is obtained. A deviation of the desulfurization ratio signal 48 from an output signal from the desulfurization ratio setting element 23 is obtained in the subtractor 32b.

In the controller 39 for the driving number of pumps, the driving number of pumps is reduced by one, when the outlet signal from the subtractor 32b is positive, that is, when the actual desulfurization ratio signal 48 is larger than the output signal from the desulfurization ratio setting element 23. Under this condition a desulfurization ratio after t minutes is anticipated in the desulfurization ratio setting element 23. Under this condition a desulfurization ratio after t minutes is anticipated in the computer 38 for anticipating the desulfurization ratio. Only when the anticipated desulfurization ratio is larger than the output signal from the desulfurization ratio setting element 23, the driving number of pumps is reduced. When the said signal from the subtractor 32 is negative, that is, when the actual desulfurization ratio signal 48 is smaller than the output signal from the desulfurization ratio setting element 23, the driving number of pumps is increased by one, and a desulfurization ratio after t minutes is anticipated in the same manner as above. The driving number of pumps is increased, so that the anticipated desulfurization ratio may not be lower than the output signal from the desulfurization ratio setting element 23.

In the computer 38 for anticipating a desulfurization ratio, a desulfurization ratio after t minutes is computed according to the following calculation formulae:

$$\eta^* = 1 - \exp(-BTU \cdot RTU1 \cdot RTU2 \cdot RTU3 \cdot RTU4) \quad (1)$$

$$RTU1 = f(pH^*) \quad (2)$$

$$RTU2 = f(G_g^*) \quad (3)$$

$$RTU3 = f(C_{so2}^*) \quad (4)$$

$$RTU4 = f(N_p) \quad (5)$$

$$BTU = -\ln(1 - \eta_o) \quad (6)$$

$$pH^* = pH + \frac{dpH}{dt} \cdot t \quad (7)$$

$$G_g^* = G_g + \frac{dG_g}{dt} \cdot t \qquad (8)$$

$$C_{so2}^* = C_{so2} + \frac{dC_{so2}}{dt} \cdot t \qquad (9)$$

where
- $\eta_o$: reference desulfurization ratio
- $\eta^*$: anticipated desulfurization ratio
- pH: pH of circulating slurry of the absorbing agent
- pH*: anticipated pH value
- $C_{so2}$: inlet SO$_2$ concentration
- $C_{so2}^*$: anticipated inlet SO$_2$ concentration
- $N_p$: driving number of pumps
- $G_g$: flue gas flow rate
- $G_g^*$: anticipated flue gas flow rate In the computer 40 for pH set value, a pH set value is calculated from an output signal from the desulfurization ratio setting element 23, an output signal from the flue gas flow rate meter 21, an output signal from the inlet SO$_2$ concentration meter 22 and an output signal from the adder 36a according to the relations of calculation formulae (1) to (6), and input to the adder 36b.

In the computer 41 for anticipating F and Cl concentrations in flue gas, F and Cl concentrations in the flue gas are anticipated from an output signal from the fuel flow rate meter 41, an output signal from the air flow rate meter 26, and an output signal from the fuel property data pool 27, and the output signal from the computer 41 is input to the computer 42 for correcting the pH set value.

The F and Cl concentrations in the flue gas are calculated according to the following formula:

$$C_x = \frac{G_{f\eta} \cdot C'_x}{G_a + G_{f\eta}}$$

wherein
- $C_x$: F or Cl concentration in the flue gas
- $G_a$: air flow rate
- $G_f$: fuel flow rate
- $\eta$: combustion ratio
- $C'_x$: F or Cl concentration in the fuel In the computer 42 for correcting the pH set value, pH correcting signals corresponding to the F and Cl concentrations are calculated, and summed up to output a pH correcting signal 49 ($\Delta$pH) according to the following formulae:

$$\Delta pH = \Delta pH_F + \Delta pH_{Cl} \qquad (10)$$

$$\Delta pH_F = f \text{ (F concentration)} \qquad (11)$$

$$\Delta pH_{Cl} = f \text{ (Cl concentration)} \qquad (12)$$

wherein $\Delta$pH : pH correcting signal

In the adder 36b, the pH correcting signal 49 and an output signal from the computer 40 for pH set value are summed up to obtain a pH set value, and in the subtractor 32c, a deviation of an output signal from the pH meter 28 from the signal of pH set value (output signal from the adder 36b) is obtained, and in the function generator 35b a correcting signal for excess ratio of the slurry of the absorbing agent is obtained in accordance with the deviation signal and input to the adder 36c. In the adder 36c, the correcting signal from the excess ratio is added to a preceding signal for the excess ratio obtained in the function generator 35c from the signal of absolute SO$_2$ amount (output signal from the multiplier 33a) to obtain a signal for excess ratio of total absorbing agent. This signal is multiplied with the signal of absolute SO$_2$ amount in the multiplier 33b to obtain a demand signal for the circulating slurry of the absorbing agent. A deviation of the demand signal from an output signal from the flow rate meter for the fresh slurry of the absorbing agent is obtained in the subtractor 32d and input to the controller 43a. A controller signal 20 for the flow rate control valve 7 for the fresh slurry of the absorbing agent as an output signal from the controller 43a adjusts the degree of opening of the flow rate control valve 7 for the fresh slurry of the absorbing agent.

The flow rate of an alkali agent to the circulating slurry is controlled as follows. F and Cl concentrations as an output signal from the computer 41 for anticipating F and Cl concentrations in flue gas multiplied with an output signal from the flue gas flow rate meter 21 in the multiplier 33c, and an output signal from the multiplier 33c is multiplied with a given factor in the scale-factor element 45 to obtain a preceding flow rate signal. A signal obtained by processing the pH deviation signal (output signal from the subtractor 32c) in the controller 43b is added to the said preceding flow rate signal from the scale-factor element 45 in the adder 37d, and a deviation of the output therefrom from an output signal from the flow rate meter 30 for the alkali agent is obtained in the subtractor 32e. The thus obtained deviation signal is processed in the controller 43c to obtain a control signal 17 for the flow rate control valve 10 for the alkali agent. The degree of opening of the flow rate control valve 10 for the alkali agent is adjusted by the signal 17.

The driving number of oxidation air blowers is controlled as follows.

In the multiplier 33d, a signal of inlet SO$_2$ amount (output signal from the multiplier 33a) is multiplied with an actual desulfurization ratio signal (output signal from the divider 34) to obtain a signal of absorbed SO$_2$ amount. An output signal from the pH meter 28 is input to the function generator 35d to obtain a factor, and an output signal from the recycle slurry flow rate meter 31 is multiplied by the factor in the multiplier 33e to obtain a signal of autogenous oxidation amount. In the subtractor 32b, the signal of autogenous oxidation amount (output signal from the multiplier 33e) is subtracted from the signal of absorbed SO$_2$ amount (output signal from the multiplier 33d) to obtain a signal of necessary oxidation amount (output from the subtractor 32b). A signal of necessary air amount corresponding to the signal of necessary oxidation amount is obtained in the function generator 35e and input to the unit 46 for controlling the driving number of oxidation air blowers to obtain a control signal 18 for the driving number of oxidation air blowers. The driving number of oxidation air blowers 9 is determined by the thus obtained control signal 18.

In the foregoing embodiments, a overall operating control of a whole plant including a combustion unit such as a boiler and a desulfurization unit can be carried out and the utilities, i.e. consumption of the absorbing agent, consumption of the alkali agent, recycle pump power for circulating the slurry through the absorption column, and oxidation air blower power, can be reduced on the basis so anticipated present and future state factors, which are difficult to determine according to the on-line method, by using on-line measurement data and anticipated future values of the combustion unit and the desulfurization unit, while maintaining the desulfurization unit performance.

Since the optimum overall operating control of a whole plant including the combustion unit and the desulfurization unit can be carried out in the present invention, the following effects can be obtained.

(1) A desired desulfurization ratio can be readily and continuously maintained against any change in fuel species and load of a combustion unit.

(2) Utilities, i.e. consumption of the absorbing agent, consumption of the alkali agent, recycle pump power for circulating the slurry through the absorption column, and oxidation air blower power, can be reduced.

(3) Since a desulfurization ratio can be anticipated, a plant abnormal state can be readily detected.

What is claimed is:

1. A method for controlling wet-process flue gas desulfurization in a whole plant including a combustion unit and a wet-process flue gas desulfurization unit comprising an absorption column for removing sulfur dioxide from a flue gas from the combustion unit by absorption using a slurry of an absorbing agent circulating through the absorption column, recycle pumps for circulating the slurry of the absorbing agent through the absorption column, and oxidation air blowers for supplying an oxidation air to the absorption column and a recycle tank, which comprises anticipating a future pH value of the circulating slurry of the absorbing agent and a future inlet sulfur dioxide content of the flue gas from a present pH value of the circulating slurry of the absorbing agent and a present inlet sulfur dioxide content of the flue gas and their change rates by computing, anticipating a future desulfurization ratio from both the anticipated pH value and inlet $SO_2$ content and a recycle rate of the circulating slurry of the absorbing agent, and controlling the recycle rate of the circulating slurry of the absorbing agent on the basis of the anticipated desulfurization ratio.

2. A method according to claim 1, wherein a necessary amount of sulfite to be oxidized is computed from amounts of sulfate and sulfite in the circulating slurry of the absorbing agent from the present pH value, a necessary amount of oxidation air is determined from the amount of sulfite to be oxidized, and a rate of the oxidation air to be introduced is controlled on the basis of the necessary amount of oxidation air.

3. A method according to claim 1 or 2, wherein the recycle rate of the circulating slurry of the absorbing agent by the recycle pumps is controlled by controlling a driving number of the recycle pumps, and the rate of oxidation air to be introduced is controlled by controlling a driving number of the oxidation air blowers.

4. A method according to claim 1 or 2, wherein a rate of a fresh absorbing agent to be supplied to the circulating slurry is controlled by adjusting a pH set value in accordance with fuel properties.

5. A method according to claim 1 or 2, wherein an alkali agent is supplied to the circulating slurry in accordance with absolute contents of F and Cl in the flue gas.

6. A method for controlling wet-process flue gas desulfurization in a whole plant including:

a fuel-fired combustion unit producing combustion products including sulfur dioxide which are expelled through a flue having a gas flow rate sensor and a sulfur dioxide content sensor, and a wet-process flue gas desulfurization unit, said desulfurization unit comprising:

an absorption column including a tank with an outlet connected to recycle pumps for recirculating a slurry containing an absorbing agent through the absorption column, blowers for supplying oxidation air to the absorption column and an inlet for introducing fresh slurry containing said absorbing agent; said method comprising:

computing a future pH value of the circulating slurry by measuring the pH value of the slurry and calculating the rate of change of the pH value of the circulating slurry;

computing a future value of the inlet sulfur dioxide content by measuring the inlet sulfur dioxide content of the flue gas and calculating the rate of change of the sulfur dioxide content of the flue gas;

computing a future desulfurization ratio by combining signals representative of the future pH value of the circulating slurry, the future value of the inlet sulfur dioxide content and the circulation rate of the slurry; and adjusting the recycle rate of the circulating slurry in accordance with the future desulfurization ratio.

7. The method according to claim 6, wherein the pH value of the slurry is computed from amounts of sulfate and sulfite in the circulating slurry and further comprising the steps of:

introducing an amount of sulfite to be oxidized in the circulating slurry in response to the present pH value of the slurry; and introducing oxidation air at a rate responsive to the amount of sulfite in the circulating slurry.

8. A method according to claim 6 wherein adjustment of the recycle rate of the circulating slurry by recycle pumps is controlled by changing a number of the recycle pumps that are made operable, and the rate of oxidation air to be introduced is varied by varying a number of the oxidation air blowers that are made operable.

9. A method according to claim 6 wherein a signal is provided which identifies components in the fuel according to the type of fuel supplied to the combustion unit which components affect the flue gas composition and the method further comprises adjusting a reference pH value for said slurry in response to the fuel type supplied to the combustion unit.

10. A method according to claim 9, wherein means are provided for producing a signal related to absolute contents of F and Cl in the flue gas and the method further comprises adjusting the introduction of an alkali agent into said slurry in response to said signal related to said F and Cl contents in the flue gas.

11. A method according to claim 7 wherein adjustment of the recycle rate of the circulating slurry by recycle pumps is controlled by changing a number of the recycle pumps that are made operable, and the rate of oxidation air to be introduced is varied by varying a number of the oxidation air blowers that are made operable.

12. A method according to claim 7 wherein a signal is provided which identifies components in the fuel according to the type of fuel supplied to the combustion unit which components affect the flue gas composition and the method further comprises adjusting a reference pH value for said slurry in response to the fuel type supplied to the combustion unit.

13. A method according to claim 12, wherein means are provided for producing a signal related to absolute contents of F and Cl in the flue gas and the method further comprises adjusting the introduction of an alkali agent into said slurry in response to said signal related to said F and Cl contents in the flue gas.

* * * * *